(12) United States Patent
Doudou et al.

(10) Patent No.: US 10,854,975 B2
(45) Date of Patent: Dec. 1, 2020

(54) ANTENNA UNIT, MULTI-ARRAY ANTENNA SYSTEM AND BASE STATION THEREOF

(71) Applicant: TONGYU COMMUNICATION INC., Zhongshan (CN)

(72) Inventors: Samb Doudou, Zhongshan (CN); ZhongLin Wu, Zhongshan (CN); Mulin Liu, Zhongshan (CN)

(73) Assignee: TONGYU COMMUNICATION INC., Zhongshan (CN)

( * ) Notice: Subject to any disclaimer, the term of this patent is extended or adjusted under 35 U.S.C. 154(b) by 53 days.

(21) Appl. No.: 16/093,576

(22) PCT Filed: Aug. 9, 2016

(86) PCT No.: PCT/CN2016/094131
§ 371 (c)(1),
(2) Date: Oct. 12, 2018

(87) PCT Pub. No.: WO2018/027538
PCT Pub. Date: Feb. 15, 2018

(65) Prior Publication Data
US 2019/0190152 A1    Jun. 20, 2019

(51) Int. Cl.
*H01Q 5/50*     (2015.01)
*H01Q 1/52*     (2006.01)
(Continued)

(52) U.S. Cl.
CPC .............. *H01Q 5/50* (2015.01); *H01Q 1/525* (2013.01); *H04B 1/00* (2013.01); *H04B 1/0057* (2013.01);
(Continued)

(58) Field of Classification Search
CPC ...... H01Q 1/246; H01Q 1/525; H01Q 21/061; H01Q 5/50; H04B 1/00; H04B 1/0057;
(Continued)

(56) References Cited

U.S. PATENT DOCUMENTS 6,434,122 B2 *   8/2002   Barabash ................. H04B 1/52
                                                       370/277
7,636,554 B2 *  12/2009   Sugar ..................... H04B 1/005
                                                        455/73
(Continued)

FOREIGN PATENT DOCUMENTS

CN       102075209 A       5/2011
CN       103858516 A       6/2014
CN       104052529 A       9/2014

OTHER PUBLICATIONS

Apr. 27, 2017 International Search Report issued in International Patent Application No. PCT/CN2016/094131.

*Primary Examiner* — Ahmed Elallam
(74) *Attorney, Agent, or Firm* — Oliff PLC (57) ABSTRACT

An antenna-unit (110) for at least dual-FDD bands includes a first combiner (100) splitting its input (101) into at least two outputs (102, 103). Each output (102, 103) operates in at least two narrow-bands from two different FDD systems, and is respectively connected to a second and third combiners (200, 300). The second and third combiners (200, 300) are respectively connected with a first RF circuit (800, 900) enabling separation of two different FDD channels in an inverted Transmitter/Receiver fashion. An antenna system (700) based on the antenna unit (110) includes a set of columns of dual-polarized radiating elements (500) arranged on a reflector (702), and the first RF circuit (800,900) is connected with a second RF circuit (10) of the Base Station processing, SDR is set along with the RF circuit (10) to enable 3D beamforming features as well as independent system link control for optimization purpose.

16 Claims, 4 Drawing Sheets

(51) Int. Cl.
- *H01Q 5/00* (2015.01)
- *H04B 1/00* (2006.01)
- *H01Q 1/24* (2006.01)
- *H01Q 21/06* (2006.01)
- *H04B 7/0413* (2017.01)
- *H04B 7/06* (2006.01)

(52) U.S. Cl.
CPC ........... *H01Q 1/246* (2013.01); *H01Q 21/061* (2013.01); *H04B 7/0413* (2013.01); *H04B 7/0617* (2013.01)

(58) Field of Classification Search
CPC .. H04B 7/0413; H04B 7/0617; H04B 1/0053; H04B 1/006; H04B 1/0064
See application file for complete search history.

(56) References Cited

U.S. PATENT DOCUMENTS

| | | | | |
|---|---|---|---|---|
| 9,319,214 B2* | 4/2016 | Khlat | | H04B 1/0057 |
| 9,893,752 B2* | 2/2018 | Domino | | H03G 3/3068 |
| 9,998,171 B2* | 6/2018 | Rosson | | H04B 1/56 |
| 10,033,337 B2* | 7/2018 | Patel | | H03F 3/195 |
| 10,122,422 B2* | 11/2018 | Wloczysiak | | H04B 1/16 |
| 10,224,642 B2* | 3/2019 | Aue | | H03F 3/24 |
| 10,439,665 B2* | 10/2019 | Domino | | H04B 1/18 |
| 10,784,935 B2* | 9/2020 | Khan | | H04B 7/08 |
| 2010/0142416 A1* | 6/2010 | Kim | | H04B 7/15542 370/281 |
| 2010/0157858 A1* | 6/2010 | Lee | | H01Q 9/40 370/297 |
| 2011/0249599 A1* | 10/2011 | Kaluzni | | H04B 1/0057 370/281 |
| 2012/0244899 A1* | 9/2012 | Barker | | H04B 7/10 455/507 |
| 2013/0095895 A1* | 4/2013 | Asuri | | H04B 1/0064 455/571 |
| 2013/0188529 A1* | 7/2013 | Poulin | | H04B 1/006 370/278 |
| 2014/0155016 A1 | 6/2014 | Schelmbauer | | |
| 2014/0329475 A1* | 11/2014 | Ella | | H04B 1/006 455/77 |
| 2016/0191107 A1* | 6/2016 | Khlat | | H04B 7/0602 370/328 |
| 2016/0285480 A1 | 9/2016 | Lv et al. | | |
| 2016/0322997 A1* | 11/2016 | Wloczysiak | | H03G 3/20 |
| 2016/0323080 A1* | 11/2016 | Khlat | | H04B 7/0413 |
| 2017/0251474 A1* | 8/2017 | Khlat | | H04B 1/0092 |
| 2017/0317710 A1* | 11/2017 | Liu | | H04B 1/0057 |
| 2017/0353287 A1* | 12/2017 | Onaka | | H04B 1/525 |
| 2019/0097585 A1* | 3/2019 | Lehtola | | H03F 1/0288 |

* cited by examiner

FIG. 8

ANTENNA UNIT, MULTI-ARRAY ANTENNA SYSTEM AND BASE STATION THEREOF

TECHNICAL FIELD

The present invention relates to a wireless communication, and particularly, to an antenna unit, a multi-array antenna system, and a base station thereof.

BACKGROUND ART

Wireless communication access will continue to increase where network-integrators aim to exploit different applications in which interference cancellation/reduction presents a vital issue for fully spectrum usage in presence of a fading changing over time environment. Besides, mobile users are demanding more application services that need high capacity offered through communication systems. As an important fact, operators struggle from extending their existing operating bands while requesting new ones for advanced network applications. And remarkable progress in wireless aims to not only satisfy the requirements for current wireless systems but also to advance the state of the art of the communication field putting it in the context of 4.5/5G architectures and beyond. These fastest emerging systems generate numerous challenges on the antenna system design as new frequency bands should be fully covered to meet the demands of various application levels impacting so the radio network design involving, for example the propagation and cell planning mechanisms. Traditional Base Transceiver Station (BTS) consists of a Remote Radio Unit (RRU) connected to the Antenna Unit (AU) and a Baseband Unit (BBU) for signal processing features. Current advanced techniques enable now to have one or two RRUs positioned directly at the antenna back-side to reduce loss due to minimized AU-to-RRU distance. However, such configuration still has drawbacks due to the fact that all antenna radiating elements from one array sharing same RRU resulting on beam forming limitations; limited vertical sectorization or higher order MIMO capability. Another drawback is that one RRU is connected to a duplexer which separates the transmitting and receiving band for only one Frequency Division Duplex (FDD) system. And the transmitting and receiving bands are generally close; so the third order intermodulation frequency (2F2-F1 or 2F1-F2 where F2 is chosen at the transmitting band and F1 in the receiving band from same FDD band) may fall easily in the receiving band. And a sized duplexer should be big enough to realize appropriate transmitting/receiving band-isolation.

Technical Problem

In order to overcome the above mentioned shortcoming, a first objective of the present invention is to supply an antenna unit for at least dual-FDD bands with good band isolation via a compact sized and integrated RF circuit.

A second objective of the present invention is to supply an antenna system with MIMO capability including multi-columns of radiating elements with independent control on each transmitting and receiving path. So, the amplitude and phase of each radiating element can be set independently enabling vertical as well as horizontal beamforming with MIMO capability (3D MIMO features) for at least two different FDD bands into one cabinet.

Solution to Problem

Technical Solution

To obtain the above objects, an antenna unit for at least dual-FDD bands in accordance with the present invention comprises: a first combiner having at least two outputs representing each at least two different FDD channels; a second combiner having one input and at least two outputs; and a third combiner having one input and at least two outputs. The first combiner has at least two outputs representing each at least two different FDD channels as a first FDD channel (FDD1) and second FDD channel (FDD2). Each output of the first combiner operates in a dual-band fashion.

The first combiner input can be terminated by a one-way channel or the first combiner input can be connected to a two-way power splitting unit. A first output of the first combiner operates in a dual-band fashion. The dual-band represents a transmission band (T1) of the first FDD channel and a reception band (R2) of the second FDD channel. A second output of the first combiner operates in a dual-band fashion, while this dual-band represents a transmission band (T2) of the second FDD channel and a reception band (R1) of the first FDD channel.

The second combiner has one input and at least two outputs. The input of the second combiner is connected to the first output of the first combiner. The first output of the second combiner operates in a single-band fashion representing the transmission band (T1) of the first FDD channel, while the second output of the second combiner operates in a single-band fashion representing the reception band (R2) of the second FDD channel. The transmitting band of the first FDD system is far from the receiving band of the second FDD one, and the size of the second combiner can be kept small and still gain good inter-band isolation (compared to traditional RRU design where transmitting and receiving bands of one single-FDD are separated by one duplexer where enough size is needed to isolate two-close bands), also intermodulation issue can be improved as the third order frequency from the first FDD transmitting band is far from falling into the second FDD receiving band.

The first output of the second combiner is connected to a first RF transmitting circuit composed of at least one filter for filtering the exact frequency of interest from the transmitting band, one driven amplifier (DA) amplifying its input signal by keeping same shape variation as the original signal, and one power amplifier (PA) for defining the gain needed for first FDD transmission channel. The second output of the second combiner is connected to a first RF receiving circuit composed of at least one LNA (Low Noise Amplifier) and one filter for the second FDD reception channel.

The third combiner has one input and at least two outputs. The input of the third combiner is connected to the second output of the first combiner. The first output of the third combiner operates in a single-band fashion representing the reception band (R1) of the first FDD channel. The second output of the third combiner operates in a single-band fashion representing the transmission band (T2) of the second FDD channel. The transmission band (T2) of the second FDD band is far from the reception band (R1) of the first FDD band, and the third combiner can be in small and compact size but still gain good inter-band isolation, also an improved intermodulation issue as the third order frequency from the second FDD transmitting band is far from falling into the first FDD receiving band. The first output of the third combiner is connected to a first RF receiving circuit/channel composed of at least one LNA and one filter for the first FDD reception channel. The second output of the third combiner is connected to a first RF transmitting circuit composed of at least one filter, one driven amplifier and one power amplifier for the second FDD transmission channel.

An antenna system based on the above antenna units for FDD multi-band.

The antenna system comprises multi-columns of radiating elements arranged in front of a reflector for transmitting and receiving in at least two different FDD bands. The radiating elements are distributed in the vertical plan as a single-element or a connected-pair of elements. The first combiner input is directly connected to a single-radiating element via an appropriate connector for example SMP to improve loss avoiding using cable as in traditional mode. The first combiner input is connected to a connected-pair of radiating elements through a power splitting unit with given ratio (such as two-way) via an appropriate connector for example SMP. One wall is inserted between each two-columns serving as a horizontal-pattern control of independent columns.

Advantageous Effects of Invention

Advantageous Effects

This invention proposed an antenna-unit for at least dual-FDD band application thus has following advantages that:

via the antenna unit comprising a first combiner splitting its input into at least two outputs, the two outputs of the first combiner operating in at least two narrow-bands from two different FDD bands each and being connected to a second and third combiners comprising each at least two outputs, at least two outputs of the second combiner connected to a first RF circuit comprising driven amplifiers, power amplifiers, LNAs and filters enabling separation of two different FDD bands in an inverted Transmitting/Receiving fashion; the band isolation between transmitting and receiving from same FDD-band are well improved, 30 dB isolation can be gained and the size of combiners can be kept small (due to the fact the transmission band of one FDD system is far from the receiving band of the other FDD one); also intermodulation issue can be improved as the third order frequency from first FDD transmitting band is far from falling into the second FDD receiving band.

Next advantages that: via a distributed multi-array antenna system proposed based on the above antenna-unit, the input of the first combiner is connected directly to a single-radiating element or to a connected-pair of radiating elements through a two-way power splitting unit, such connection improves loss avoiding using cable as in traditional mode.

Further, a Software Defined Radio (SDR) is set along with the second RF circuit with software embedded so as to enable beam forming featuring as well as independent transmitting/receiving control for optimization purpose. So, the amplitude and phase of each radiating element can be set independently enabling vertical as well as horizontal beam-forming with MIMO capability (3D MIMO features) for at least two different FDD bands with one antenna.

BRIEF DESCRIPTION OF DRAWINGS

Description of Drawings

The physical embodiments adopted in the present invention will be presented by the following depicted embodiments and accompanying drawings for further explanations.

MODE FOR THE INVENTION

Mode for Invention

In order to facilitate understanding of the present invention, the following descriptions accompanying attached drawings are presented to further completely describe the present invention. Attached drawings show a preferred embodiment of the present invention. However, the present invention may be implemented by many different forms thereof and is not limited to the preferred embodiments described herein. On the contrary, the purpose of providing these embodiments is for much more thorough and entire understanding of the published disclosure of the present invention.

Referring to FIGS. 1-5, in accordance with an embodiment of this invention, a new architecture of the antenna-unit 110 proposed for at least dual-FDD bands, comprises having at least three combiners 100, 200, 300 and a set of RF circuits 800, 900 enabling separation of at least two different FDD bands. The first combiner 100 is capable of splitting its input 101 into at least two outputs 102, 103. The outputs 102, 103 operates in at least two narrow-bands from two different FDD systems each, and are connected to a second and third combiners 200,300 comprising each at least two outputs 202/203, 301/303. At least two outputs 202, 203 of the second combiner 200 are connected to a first RF circuit 800. The first RF circuit 800 comprises a driven amplifier 402, a power amplifier 401, LNAs 408, 412 and filters 405, 410 in a careful chosen placement enabling separation of two different FDD channels in an inverted Transmitting/Receiving fashion.

Figure 1:
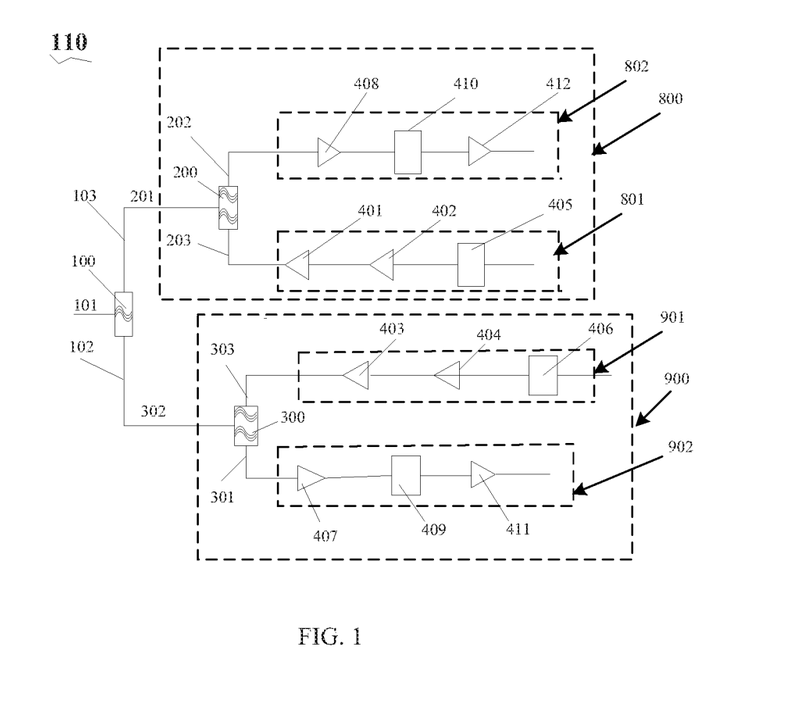
FIG. 1 is a schematic view of a RF circuit of an antenna unit in accordance with a first embodiment of the present invention.

The first combiner 100 has at least two outputs 102 and 103. The combiner input channel 101 operates into a wide-band mode for at least two FDD-bands denoted as FDD1 and FDD2. FDD1 has transmitting and receiving bands of T1 and R1 respectively. FDD2 has transmitting and receiving bands of T2 and R2 respectively.

Accordingly, an antenna assembly or the antenna-unit 110 of the present invention can work for in a number N of FDD networks (short for FDDx) with a transmitting band Tx and a receiving band Rx for each FDD.

In an exemplary embodiment, FDD1 can be LTE1800, wherein, the transmitting band T1 of FDD1 is in a range of 1710-1785 MHz, while the receiving band R1 of FDD1 is in a range of 1805-1880 MHz.

In another exemplary embodiment, FDD2 can be LTE2600, wherein, the transmitting band T2 of FDD2 is in a range of 2500-2570 MHz, while the receiving band R2 of FDD2 is in a range of 2620-2690 MHz.

In a third exemplary embodiment, FDD1 or FDD2 could be UMTS2100, wherein, T1 or T2 can be in a range of 1920-1980 MHz, while R1 or R2 is in a range of 2110-2170 MHz.

In this embodiment, the first output 103 of the first combiner 100 operates in a dual-band mode representing T1 of FDD1 and R2 of FDD2. And the second output 102 operates in a dual-band mode representing T2 of FDD2 and R1 of FDD1. The second combiner 200 is connected to the second output 103 of the first combiner 100 via its input channel 201, and splits its input into two output channels 202 and 203 operating each in a single-band mode. A first output 203 of the second combiner 200 represents the transmitting channel 801 of FDD1 with the operation band of T1, while a second output 202 represents the receiving channel 802 of FDD2 with the operation band of R2. The combiner 200 of the antenna unit 110 obtains an inverted Transmitting/Receiving fashion via having first output 203 transmitting for FDD1 while the second output 202 receiving for FDD2.

The third combiner 300 is connected to the second output 102 of the first combiner 100 via its input channel 302, and splits its input into two output-channels 301 and 303. The first input 301 represents a receiving channel 902 of FDD1 at the operation band of R1; and the second input 303 represents a transmitting channel 901 of FDD2 at the operation band of T2.

In the embodiments above, the first transmitting band T1 of FDD1 and the receiving band R2 of FDD2 are separated by the second combiner 200, and the second combiner 200 can be in a small size since T1 and R2 are far isolated (enough isolation compared to 'T1 and R1' or 'T2 and R2'). The first RF circuit 800 comprises a power amplifier (PA) 401, a driven amplifier (DA) 402 and a first filter 405 for the transmitting channel 801 of FDD1; and further comprises a first LNA 408, a second filter 410 and a second LNA 412 for the receiving channel 802 of FDD2. It is understood that Extra PA, DA (to increase the gain and output power) and LNAs (to reduce the noise figure level) can be also cascaded depending on system requirements.

In a transmission mode of the first RF circuit, the first filter 405 keeps only the narrow-band of interest from the first transmitting band T1 of FDD1. Generally, the first transmitting band T1 is a common transmitting band to be shared by a certain number of network operators. The output of the first filter 405 is amplified by the DA 402 outputting a signal with a gain factor. The gain factor is carefully defined depending on system requirements. Finally, the PA 401 with 50 ohm output impedance is connected to the first output 203 of the second combiner 200. As an embodiment, the PA 401 and DA 402 are designed to match 21 dBm output power that can be inputted to an antenna radiating element.

During a reception mode, LNA 408 amplifies the output signal from the second combiner 200, and a filtering action is followed by the filter 410 to keep only the narrow-band of interest from the second receiving band R2. Generally, R2 is a common receiving band to be shared by a certain number of network operators. A second LNA 412 is selectably used to improve the noise figure level. In a particular embodiment, the LNAs 408 and 412 are designed to match a noise level less than 2.5 dB.

In accordance with an embodiment of the present invention, respective RF-components of the first RF circuit 800 are in such a careful chosen placement that the first output 203 of the second combiner 200 is connected to the first RF transmitting circuit 801 composed of at least one filter 405, one driven amplifier 402 and one PA 401 orderly connected; while the second output 202 of the second combiner 200 is connected to the first RF receiving circuit 802 composed of at least one LNA 408 and one filter 410 orderly connected.

In the first FDD transmission channel 801, the filter 405 is capable of filtering the exact frequency of interest from the transmitting band; the driven amplifier 402 is capable of amplifying its input signal by keeping same shape variation as the original signal; and the PA 401 is capable of defining the gain needed.

Similar description can be adopted for the third combiner 300 as the second combiner 200, where the first RF circuits 900 will have to be adopted according to respective frequency bands T2 and R1. And similar description can be adopted for the first RF circuit 900 as the first RF circuit 800.

The second transmitting band T2 and the first receiving band R1 are far isolated (compared to 'T1 and R1' or 'T2 and R2') and can be separated by the third combiner 300 which has a small size with enough band-isolation capability. A power amplifier (PA) 403, a driven amplifier (DA) 404 and a first filter 406 are orderly connected as the transmitting channel 901 of FDD2; and A first LNA 407, a second filter 409 and a second LNA 411 are orderly connected as the receiving channel 902 of FDD1. The transmitting mode and the receiving mode from the third combiner 300 are the same as those of the second combiner 200.

Figure 2:
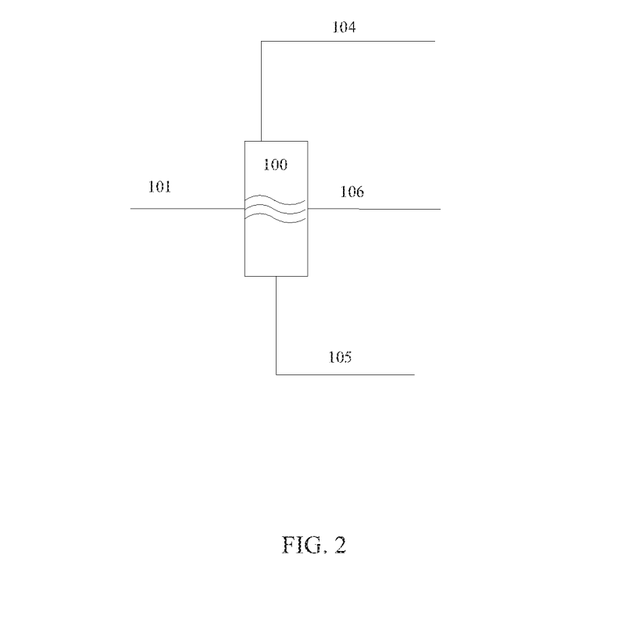
FIG. 2 is a schematic view of a first combiner in accordance with a second embodiment of the present invention.

Referring to FIG. 2, for three different FDD network in accordance with one embodiment of the present invention, the first combiner 100 comprises three outputs 104, 105, 106 that can be used for three FDD-bands, denoted as FDD1 (operating at a transmitting band T1 and receiving band R1), FDD2 (operating at a transmitting band T2 and receiving band R2) and FDD3 (operating at a transmitting band T3 and receiving band R3). As an illustrative example, FDD1 can be UMTS2100, has the transmitting band T1 in a range of 1920-1980 MHz and the receiving band R1 in a range of 2110-2170 MHz; FDD2 can be LTE1800, has the transmitting band T2 in a range of 1710-1785 MHz and the receiving band R2 in a range of 1805-1880 MHz; and FDD3 can be LTE2600, has a transmitting band T3 in a range of 2500-2575 MHz and a receiving band R3 in a range of 2620-2690 MHz. The three outputs 104, 105 and 106 can be arranged to operate into frequency bands as T1&R2 at a first output 104, T2&R3 at a second output 105 and T3&R1 at a third output 106. It is understood that three compact combiners are respectively connected to the three outputs 104, 105, 106, and each combiner has both output thereof connected with the first RF circuit and operating in a single-band mode. The three compact combiners are each similar as the second or the third combiners 200, 300 in FIG. 1 in accordance with the above embodiments.

Figure 3:
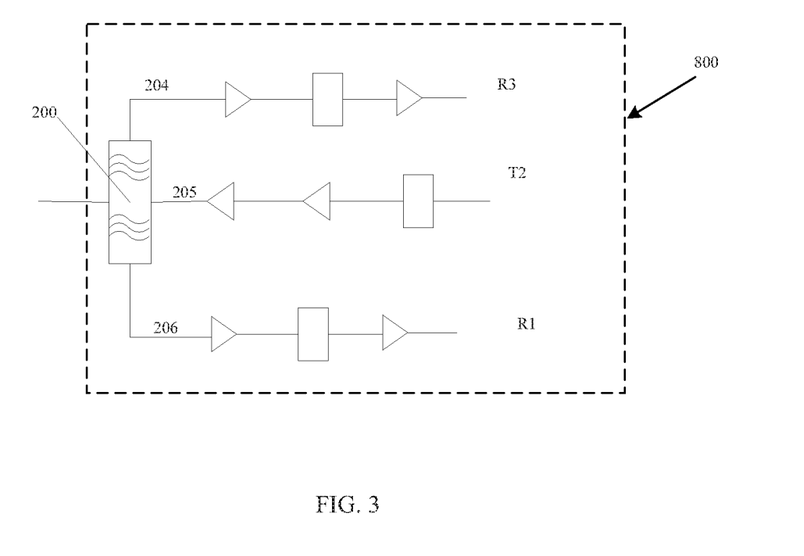
FIG. 3 is a schematic view of a second combiner in accordance with a third embodiment of the present invention.

Referring to FIG. 3, for three different FDD bands in accordance with another embodiment of the present invention, the second combiner 200 comprises three outputs 204, 205 and 206 separating three single bands from three different FDD systems each via a first RF circuit 800. As an example R1, T2 and R3 are far separated respectively for FDD1, FDD2 and FDD3 by the second combiner 200 since the bands of R1, T2 and R3 are far from each other. Accordingly the third combiner 300 can also be configured to have three outputs for separating R2, T1 and T3 for complete Tx/Rx systems of three FDD systems.

Figure 4:
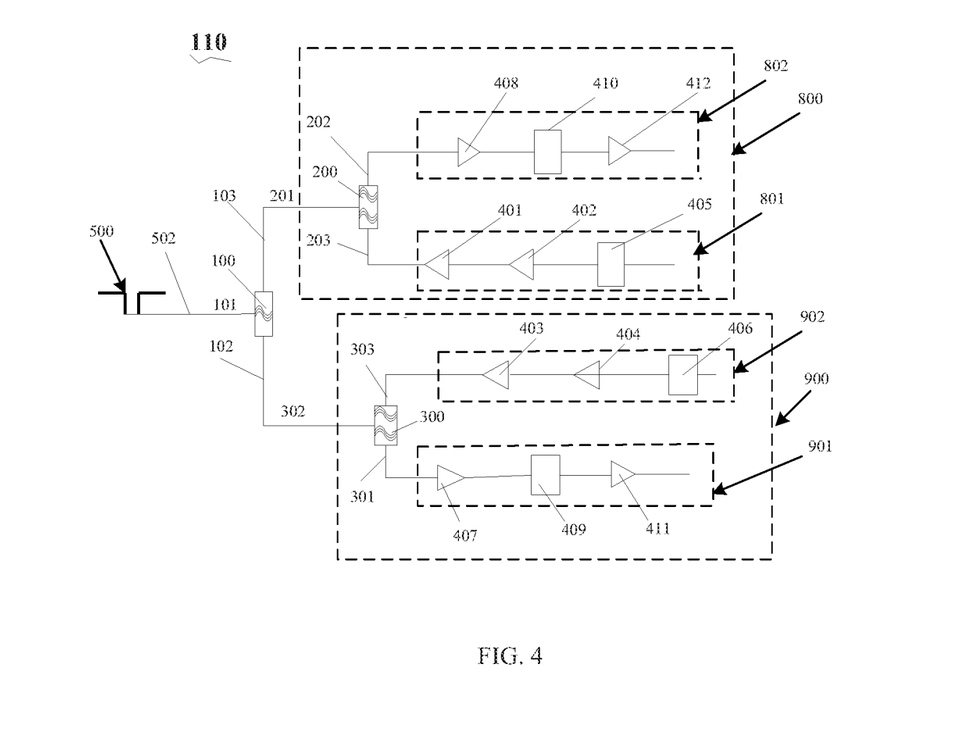
FIG. 4 is a schematic view of the antenna unit connected directly to one antenna radiating element.

Further referring to FIG. 4, the antenna unit 110 further comprises a radiating element 500 directly connected to the first combiner 100. Such direct connection between the radiating element 500 and the first combiner 100 can be established via an appropriate connector 502 featuring a flexible interface between different RF-components, for example a Push-onconnector such as SMP (Sub Miniature Push-on) connector, SMP-MAX connector, or SMA (Small Miniature Assembly) connector; the direct connection between the antenna radiating element 500 and the combiner 100 can improve loss therebetween via avoiding cable as in a traditional RRU-AU connection.

Figure 5:
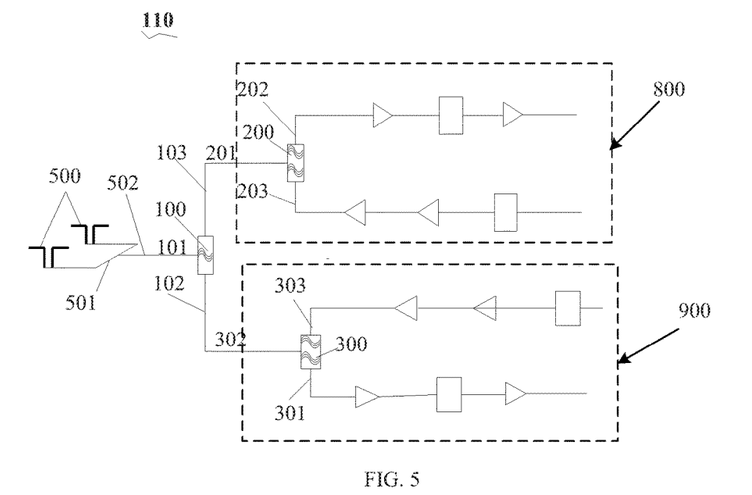
FIG. 5 is a schematic view of the antenna unit connected to antenna radiating elements.

Referring to FIG. 5 in accordance with another embodiment, the antenna unit 110 further comprises a connected-pair of radiating elements 500 directly connected with the first combiner 100 through a power splitting unit 501 via an appropriate connector 502 for example SMP connector, SMP-MAX connector, or SMA connector. The power splitting unit 501 with a given ratio can be a two-way power splitter, and the two-splitting way can have equal/unequal amplitude/phases.

Figure 6:
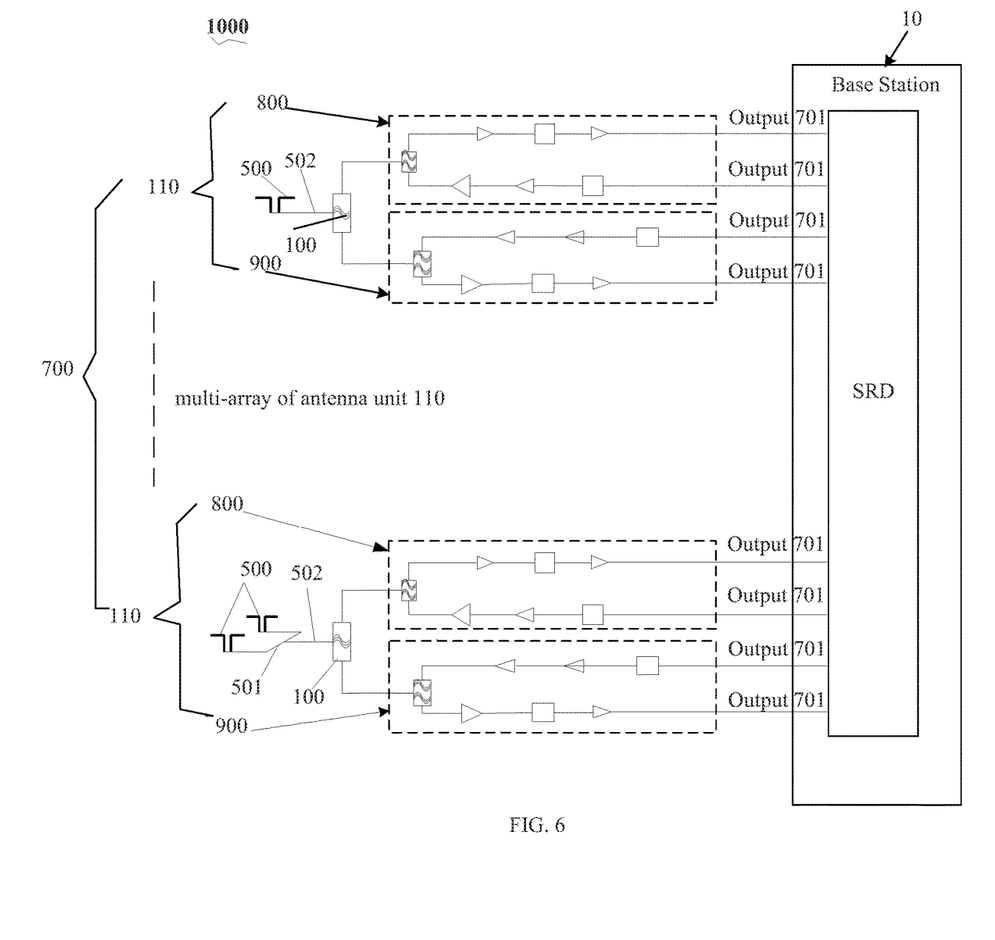
FIG. 6 is a schematic view of a Base Station in accordance with an embodiment of the present invention.
Figure 7:
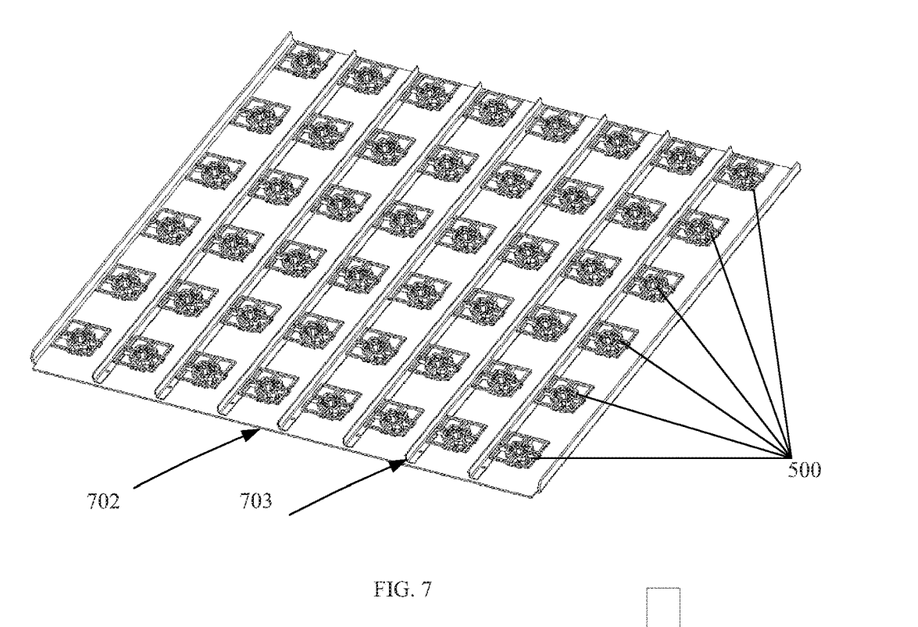
FIG. 7 is a perspective view of distributed multi antenna-arrays in accordance with an embodiment of the present invention.
Figure 8:
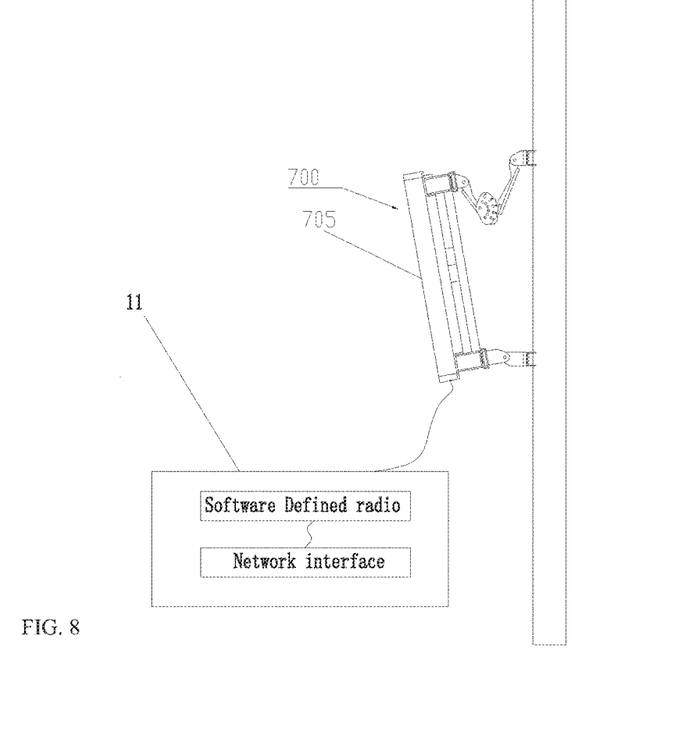
FIG. 8 is an illustrative view of the Base Station architecture in accordance with an embodiment of the present invention.

Referring to FIGS. 6-8 together, an antenna system 700 is proposed based on the above antenna-units 110 in accordance with an embodiment of the present invention, can comprises multi-array of antenna unit 110 of FIGS. 1-5. Wherein, multiple first combiners 100 of the multi-array of antenna unit 110 each have one input channel 101 so as to form multiple inputs 101 and have two or more outputs 102, 103; each output 102, 103 is respectively connected with a first RF circuit 800, 900 via one compact combiner 200, 300. Each compact combiner 200, 300 has two or more outputs and operates each in a Dual-FDD inverted mode via two outputs of each combiner respectively representing a transmission band of one FDD network and a reception band of another FDD network; and accordingly, multiple RF receiving channels form multiple outputs 701 of the antenna system 700, and the independent path can be optimized for vertical sectorization for both FDD systems, the antenna system 700 as a MIMO system (3D MIMO features) is formed. The combiners 100, 200, 300 and the RF circuits 800, 900 can be integrated in into one cabinet 705.

The multiple outputs 701 of the antenna system 700 are connected to a second RF circuit 10 of the base station 1000. A SDR (Software Defined Radio) is preferably set along with the second RF circuit 10 of the base station 1000. The SDR enables beamforming features as well as independent system link control for optimization purpose. Doing so, enable to have independent control on transmitting power as well as receiver sensitivity; and the independent path can be optimized for both horizontal and vertical sectorization for both FDD systems (3D MIMO features).

Referring to FIG. 7 in accordance with one embodiment of the present invention, multi-array configuration of dual-polarized radiating elements 500 arranged in front of a reflector 702 transmitting and receiving in at least two different FDD bands operating in a wide range of 1710-2690 MHz. The antenna-unit 110 can be used with a single-radiating element or a connected-pair of radiating elements to realize the multi-FDD antenna systems 700 which features MIMO as well as massive MIMO antenna. One wall 701 is inserted between two-columns/arrays serving as a horizontal-pattern control of independent columns. The amplitude and phase of each radiating element 500 can be varied independently based on a SDR; So that vertical sectorization can be achieved featuring 3D MIMO applications.

In the Base Station antenna processing, SDR(Software Defined Radio) defines the waveforms and weights of the transmitted signal and sends the weighted signals to each of the filters 405/406 of the first RF transmitting circuit 801/901, herein the weights specify the different amplitudes/phases of each transmitting path enabling the beamforming capability. Each filter 405/406 then keeps only the frequency of interest by eliminating other transmitting band from other network operators and sends its input to a driven amplifier 402/404; the driven amplifier 402/404 amplifies in voltage. The amplified signal keeps same shape variation as the original signal but different amplitude level depending on the desired power gain and sends its input to the PA 401/403 setting the output power and sends the signal to a combiner 200/300 (referring to the second combiner 200 or the third combiner 300 in above embodiments of this invention). The combiner 200/300 selects the corresponding path based on the frequency of interest and sends the input signal to the first combiner 100 which also select the corresponding path of the signal of interest. The first combiner 100 sends its input signal received from the second/third combiner 200/300 to a radiating-element 500 or a two-way power splitting 501 which splits its input into two-outputs to two radiating-elements 500. The radiating element 500 converts its received signal into electromagnetics wave to be sent throughout the space.

Otherwise, the electromagnetics wave in the space from user terminals, are received by the radiating elements 500 and is converted into RF signals, then is input to the first combiner 100 which selects the corresponding path of the received signal The selected combiner 200/300 then sends its input to LNA 407 or 408 which amplifies the output signal from the combiner 200/300, and a filtering action is followed by the filter 409 or 410 to keep only the narrow-band of interest from the receiving band R1 or R2. A second LNA 411 or 412 can be used to improve the noise figure level of the signal from the output of the filter 409 or 410; finally, the signal from the second LNA 411 or 412 is input to the second RF circuit 10 of the Base Station with SDR set along for the Base Station processing.

As used herein, the terminology "Dual-FDD inverted mode" has same meaning as "FDD channels in an inverted Transmitter/Receiver fashion". The terminology "Dual-FDD inverted mode" has same meaning as "FDD channels in an inverted Transmitter/Receiver fashion". The terminology "inter-band isolation" can be illustrated as "isolation between operating bands at the same combiner". The terminology "input" and be understood as "input signal" or "input channel". The terminology "output" can be understood as "output signal" or "output channel". "FDD networks", "FDD system", "FDD" or "FDD Channels" may be the same meanings. The terminology "transmitting channel", "transmitting path", or "transmitting circuit" may be understood as the same meaning. The terminology "receiving channel", "receiving path", or "receiving circuit" may be understood as the same meaning too.

Descriptions and applications of the present invention herein are intended to be illustrative, not intended to limit the scope of the present invention to the above described embodiment. Variations and modifications of the embodiment disclosed herein are possible, and for those of ordinary skilled in the field, alternatives and equivalents of various components of the embodiment disclosed herein are common senses and well known. Where any person skilled in this art should know that the present invention can be achieved in other forms, structures, arrangements, proportions, and with other components, materials, and parts, the changes or improvements are still covered within the inventive spirit of the present invention and the scope as defined in the following claims. Without departing from the spirit and scope of the present invention, other modifications and changes of the embodiment disclosed herein can be made and still be covered by the claimed scope of the following claims.

The invention claimed is:

1. An antenna for communicating in a first Frequency Division Duplex (FDD) band and a second FDD band, comprising:
   a first combiner splitting an input channel thereof into a first output channel and a second output channel;
   a second combiner having an input channel thereof connected to the first output channel and splitting the first output channel into two output channels; and
   a third combiner having an input channel thereof connected to the second output channel and splitting the second output channel into two output channels,
   wherein the second and third combiners are configured to separate the first and second FDD bands in an inverted transmitter/receiver fashion, and
   one of the output channels of the second combiner is configured to carry a transmission band of the first FDD band, another of the output channels of the second combiner is configured to carry a reception band of the second FDD band, one of the output channels of the third combiner is configured to carry a transmission band of the second FDD band, and another of the output channels of the third combiner is configured to carry a reception band of the first FDD band.

2. The antenna as claimed in claim 1, wherein the two output channels of both the second and third combiners are respectively connected with a first RF circuit, the first RF circuit comprises one FDD transmission channel and one FDD reception channel, and is configured to isolate the first and second FDD bands from each output channel of the first combiner.

3. The antenna as claimed in claim 2, wherein the FDD transmission channel comprises a first filter, a driven amplifier connected to an output of the first filter, and a power amplifier connected to an output of the driven amplifier; an output of the power amplifier is connected to one output of the second or third combiner; the FDD reception channel comprises a Low Noise Amplifier (LNA) connected to one output of the second or third combiner, and a second filter connected to an output of the LNA.

4. The antenna as claimed in claim 3, wherein the first filter is configured to filter an exact frequency of interest from the transmission band, the driven amplifier is configured to amplify an input signal by keeping same shape variation as an original signal; the power amplifier is configured to define a gain needed for the FDD transmission channel; the LNA is configured to amplify an output signal from the second or third combiner, and a filtering action is followed by the second filter to keep only narrow band of interest from the reception band.

5. The antenna as claimed in claim 4, wherein the power amplifier with 50 ohm output impedance is connected to one of the output channels of the second or third combiner; the power amplifier and the driven amplifier are designed to match 21 dBm output power.

6. The antenna as claimed in claim 4, wherein the FDD reception channel further comprises a second LNA following the second filter to improve a noise figure level; the first and second LNAs are designed to match a noise level less than 2.5 dB.

7. The antenna as claimed in claim 1, further comprising a single radiating element or a connected-pair of radiating elements; wherein the input channel of the first combiner is directly connected to the single radiating element or the connected pair of radiating elements via a connector featuring a flexible interface between different RF components; the connected pair of radiating elements are connected by a power splitter configured to split an input channel into two output channels each connected to one of the pair of radiating-elements.

8. The antenna as claimed in claim 7, wherein the connector is any one of SMP connector, a SMP-MAX connector, or a SMA connector; and the antenna is an active antenna.

9. The antenna as claimed in claim 1, wherein the first and second FDD bands are in a range of 1710-2690 MHz.

10. The antenna as claimed in claim 1,
   wherein each of the second and third combiners is configured to: be a compact size; have enough band-isolation capability; and far isolate the first and second FDD bands from each output channel of the first combiner, and
   the first, second, and third combiners are integrated in the antenna.

11. The antenna as claimed in claim 1, wherein the transmission band of the first FDD band is far from the reception band of the second FDD band; and a third order intermodulation frequency from the transmission band of the first FDD band is far from falling into the reception band of the second FDD band.

12. An antenna system, comprising multiple antennas as claimed in claim 1, the antennas forming multiple input and output channels; wherein multi-column of dual-polarized radiating elements are arranged in front of a reflector, one wall is inserted between every two columns serving as a horizontal-pattern control of independent columns; each antenna has one input channel directly connected with a radiating element or a connected-pair of radiating elements, and is configured to independently control on transmitting and receiving paths for the first and second FDD bands; and amplitude and phase of each radiating element is set independently enabling vertical and horizontal beamforming with MIMO capability for the first and second FDD bands in one cabinet.

13. The antenna system as claimed in claim 12,
   wherein the radiating elements are distributed in a vertical plan as single-element or a connected-pair of elements.

14. The antenna system as claimed in claim 13, wherein the two output channels of each the second and third combiners are connected with a first RF circuit; the first RF circuit comprises a FDD transmission channel and a FDD reception channel configured to isolate the first and second FDD bands from each output channel of the first combiner and forming the multi-outputs of the antenna system.

15. The antenna system as claimed in claim 14, further comprising a second RF circuit for base Station processing; and a Software Defined Radio that is set along the second RF circuit for enabling beamforming features and independent system link control of the FDD transmission and reception channels of the first RF circuit that are connected with the second RF circuit.

16. The antenna system as claimed in claim 14, wherein the FDD transmission channel comprises a first filter, a driven amplifier connected to an output of the first filter, and a power amplifier connected to an output of the driven amplifier; an output of the power amplifier is connected to one output channel of the second or third combiner; the FDD reception channel comprises an LNA connected to one output channel of the second or third combiner, and a second filter connected to an output of the LNA.

* * * * *